United States Patent [19]
Kanota et al.

[11] Patent Number: 5,253,123
[45] Date of Patent: Oct. 12, 1993

[54] APPARATUS FOR DIGITALLY RECORDING TIME-MULTIPLEXED DIGITAL INFORMATION AND PILOT SIGNALS WITH DIFFERENT RECORDING CURRENT LEVELS

[75] Inventors: Keiji Kanota; Takahito Seki, both of Kanagawa, Japan

[73] Assignee: Sony Corporation, Tokyo, Japan

[21] Appl. No.: 692,993

[22] Filed: Apr. 29, 1991

[30] Foreign Application Priority Data

May 7, 1990 [JP] Japan .................... 2-117153

[51] Int. Cl.$^5$ .................................... G11B 5/09
[52] U.S. Cl. ............................ 360/46; 360/61
[58] Field of Search ............ 360/25, 27, 28, 46, 360/61, 65, 66, 67, 68, 75

[56] References Cited

U.S. PATENT DOCUMENTS

| | | | |
|---|---|---|---|
| 4,422,108 | 12/1983 | Sampei et al. | 360/65 |
| 4,786,990 | 11/1988 | Overton et al. | 360/65 |

FOREIGN PATENT DOCUMENTS

| | | |
|---|---|---|
| 0117753 | 9/1984 | European Pat. Off. |
| 3203541A1 | 8/1983 | Fed. Rep. of Germany |
| WO89/02190 | 3/1989 | PCT Int'l Appl. |

OTHER PUBLICATIONS

Patent Abstracts of Japan, vol. 13, No. 502 (P-958) (3850) Nov. 13, 1989 & JP-A-1 201 801 (Mitsubishi Electric Co.) Aug. 14, 1989.

Patent Abstracts of Japan vol. 4, No. 103 (P-20) (585) Jul. 23, 1980 & JP-A-55 062 509 (Pioneer K. K.) May 12, 1980.

Patent Abstracts of Japan vol. 12, No. 313 (P-749) (3160) Aug. 25 1988 & JP-A-63 081 603 (Matsushita Electric Ind. Co.) Apr. 12, 1988.

*Primary Examiner*—David Mis
*Attorney, Agent, or Firm*—William S. Frommer; Alvin Sinderbrand

[57] ABSTRACT

A digital signal processing apparatus adapted for use in a digital video tape recorder or the like. The apparatus includes a digital multiplexer for combing an input digital information signal and an input digital pilot signal with each other on a predetermined time basis so as to produce a composite recording signal; and a variable gain amplifier supplied with the composite recording signal of the digital multiplexer for amplifying at least one of the digital information signal and the digital pilot signal in the composite recording signal to respective different levels. With a relatively simple circuit configuration and a control action which operates in a relatively straight-forward manner, a relatively high operational reliability is achieved.

3 Claims, 6 Drawing Sheets

FIG. 2A Digital recording signal Sf
FIG. 2B Digital servo pilot signal Se
FIG. 2C Switching signal Ss
FIG. 2D Composite recording signal Sr
FIG. 2E Amplified recording signal Sm

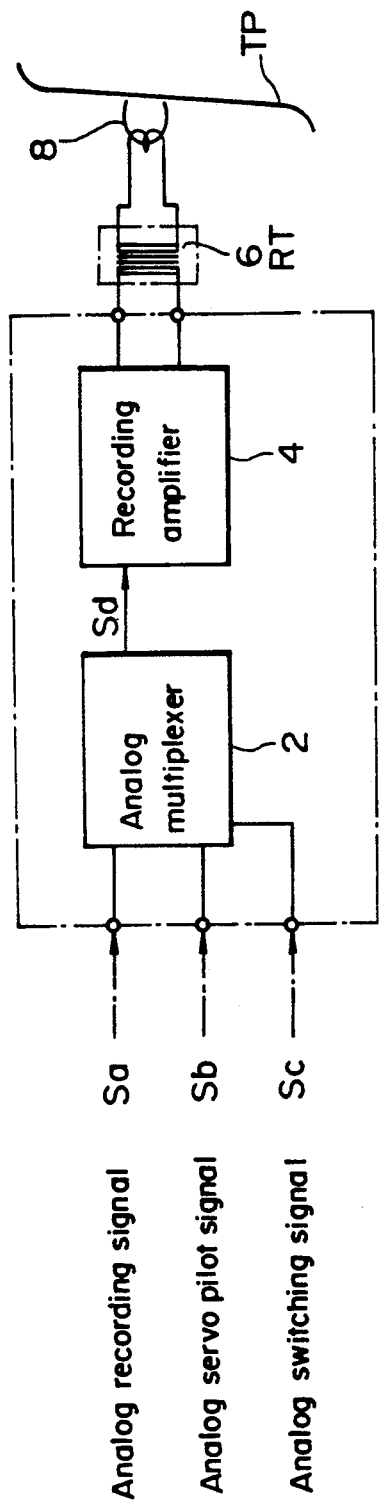

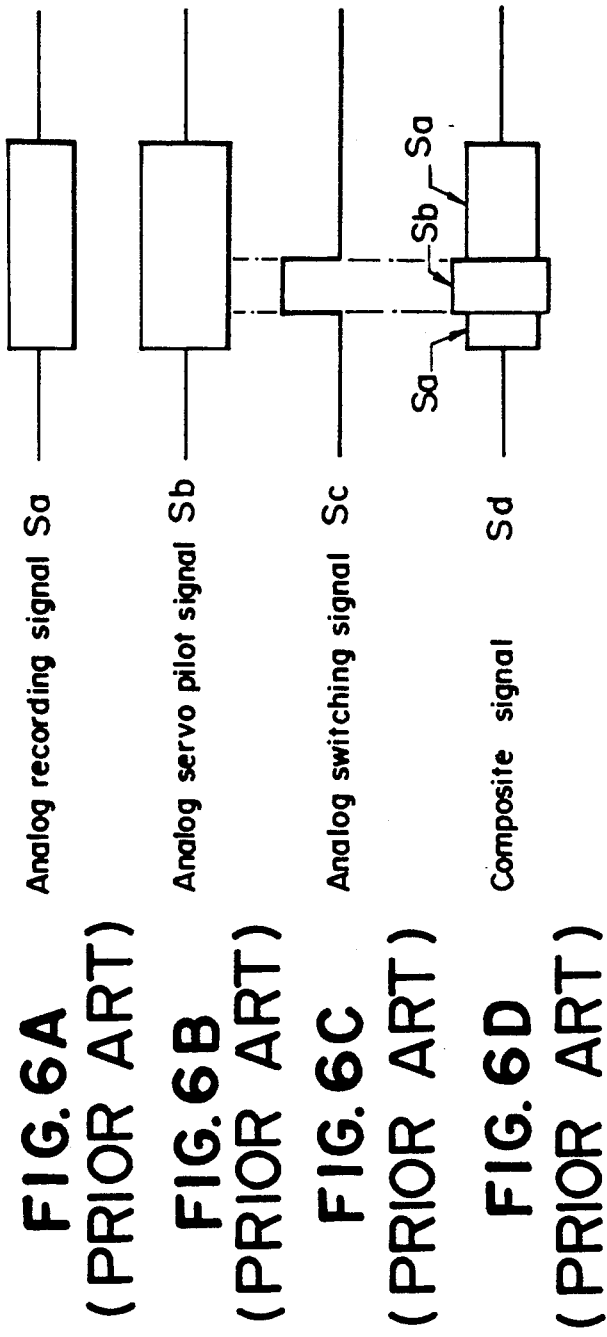

APPARATUS FOR DIGITALLY RECORDING TIME-MULTIPLEXED DIGITAL INFORMATION AND PILOT SIGNALS WITH DIFFERENT RECORDING CURRENT LEVELS

BACKGROUND OF THE INVENTION

1. Field of the Invention

The present invention relates to a digital signal processing apparatus adapted for use in a digital video tape recorder or the like.

2. Description of the Prior Art

In an 8-mm video tape recorder (VTR), it is generally customary that a servo pilot signal generated for automatic tracking in a recording/playback mode is combined with a recording information signal on a time basis to produce a composite signal, which is then recorded on a magnetic recording medium such as a magnetic tape.

A conventional signal processing apparatus for performing such a recording operation is shown in FIG. 5, and examples of signal waveforms processed in this apparatus are shown in FIG. 6.

The signal processing apparatus of FIG. 5 includes an analog multiplexer 2 and a recording amplifier 4, in which an analog recording signal Sa and an analog servo pilot signal Sb as, for example, shown in FIGS. 6A and 6B, respectively, are controlled so as to have respective predetermined levels by amplifiers (not shown) and are then supplied to the analog multiplexer 2. Thereafter, the analog recording signal Sa and the analog servo pilot signal Sb are combined with each other on a predetermined time basis through the use of an analog switching signal Sc, such as the switching signal shown in FIG. 6C to produce a composite signal Sd. The composite signal Sd is current-amplified by the recording amplifier 4 and supplied via a rotary transformer (RT) 6 to a magnetic head 8, whereby the signal Sd is recorded on a magnetic tape Tp.

The analog pilot signal Sb has a level higher than that of the recording signal Sa as recorded on the magnetic tape Tp and, as a result, an increased carrier-to-noise ratio is attained when the analog pilot signal Sb is read out later.

In the conventional signal processing apparatus described above, the analog recording signal Sa supplied to the analog multiplexer 2 may lie in a frequency band of, for example, 20 to 30 MHz, while the analog servo pilot signal Sb may lie in a frequency band of several MHz. For amplifying such wide-band signals to desired flat levels, a high-frequency amplifier having a relatively complicated circuit configuration is needed. As a result, it is very difficult if not impossible to meet the recent requirements regarding dimensional or scale reduction of both the apparatus as a whole and the signal processing unit. Furthermore, another disadvantage exists in that characteristic variations are prone to occur due to temperature fluctuations and so forth which prevent high reliability from being attained.

OBJECTS AND SUMMARY OF THE INVENTION

Accordingly, it is an object of the present invention to provide a digital signal processing apparatus which avoids the above-mentioned disadvantages of the prior art.

More specifically, it is an object of the present invention to provide an improved digital signal processing apparatus which is capable of performing the control operations with a circuit having a relatively simplified configuration which operates with relatively high reliability.

According to one aspect of the present invention, a digital signal processing apparatus comprises a digital multiplexer for combining an input digital recording information signal and an input digital servo pilot signal with each other on a predetermined time basis to produce a composite recording signal; and a variable gain amplifier supplied with the composite recording signal of the digital multiplexer for amplifying the digital information signal and the digital servo pilot signal in the composite recording signal to respective different levels.

The above, and other objects, features and advantages of the present invention will be apparent in the following detailed description of a preferred embodiment of the present invention which will be given with reference to the accompanying drawings in which corresponding parts are identified by the same reference numerals.

BRIEF DESCRIPTION OF THE DRAWINGS

FIG. 5 is a block diagram of a conventional signal processing apparatus; and

FIGS. 6A through 6D illustrate waveforms of processed signals used for explaining the operation of the conventional signal processing apparatus shown in FIG. 5.

DETAILED DESCRIPTION OF THE PREFERRED EMBODIMENT

A digital signal processing apparatus according to the preferred embodiment of the present invention will now be described in detail with reference to FIGS. 1-4.

Figure 1:
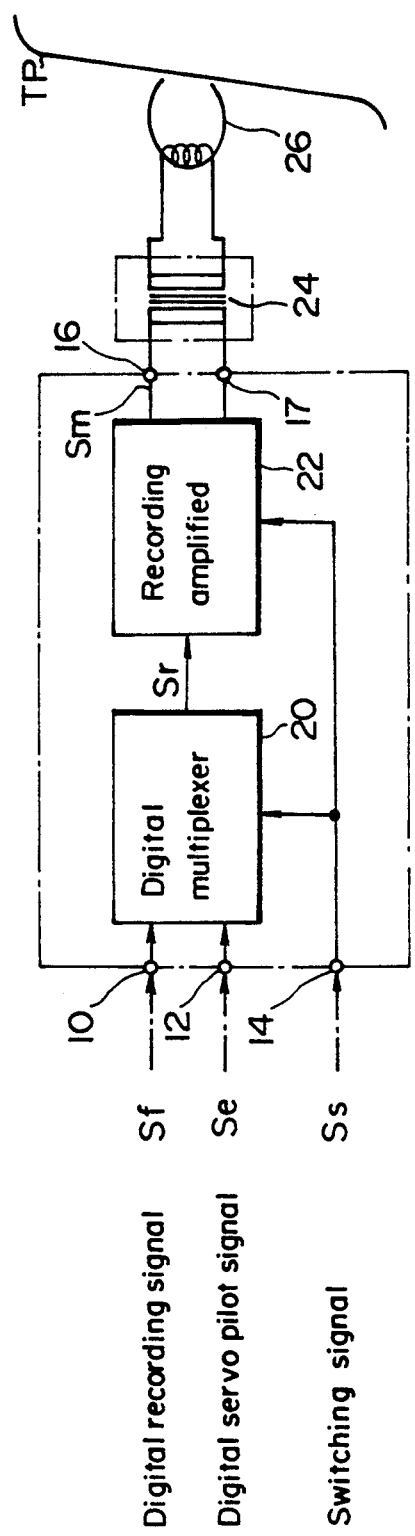
FIG. 1 is a block diagram of a digital signal processing apparatus according to an embodiment of the present invention.
Figure 2:
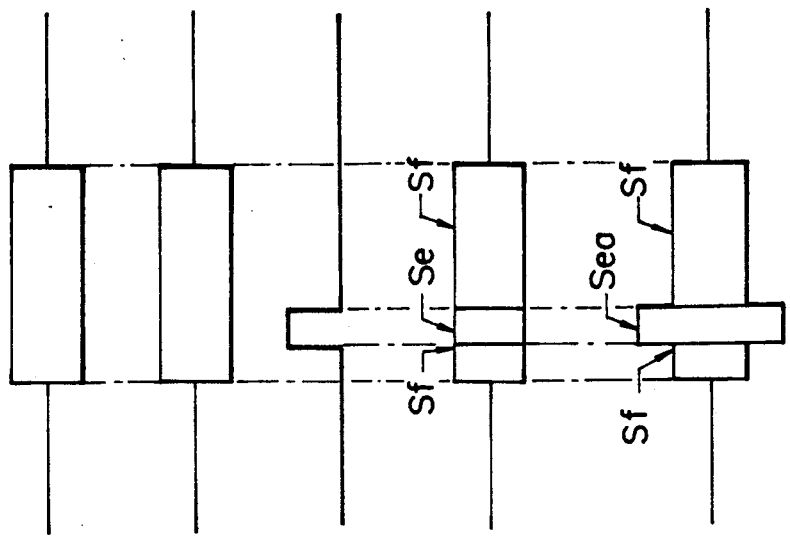
FIGS. 2A through 2E illustrate waveforms of processed signals to which reference will be made in explaining the operation of the apparatus shown in FIG. 1.

In FIG. 1, a digital recording signal Sf is supplied to a first input terminal 10. The signal Sf is produced by quantizing and digitizing an analog composite signal which lies in a frequency band of, for example, 20 to 30 MHz and which may be obtained from a video signal processor in which an image signal of a subject obtained by a video camera having relatively high image quality is processed. A digital servo pilot signal Se is supplied to a second input terminal 12. The signal Se is produced by quantizing and digitizing an analog servo pilot signal which lies in a frequency band of, for example, several MHz and which may be generated by a video signal processing circuit or the like connected to the second input terminal 12.

A switching signal Ss is supplied to a third input terminal 14. The switching signal Ss is produced by a timing generator or the like in a video signal processing circuit connected to the third input terminal 14 and is used for superimposing the digital servo pilot signal Se on the digital recording signal Sf on a predetermined time basis.

The switching signal Ss, the digital recording signal Sf and the digital servo pilot Se from the input terminals 14, 10 and 12, respectively, are supplied to a digital multiplexer 20, where the digital recording signal Sf and the digital servo pilot signal Se are combined with each other on a predetermined time basis by a switching action in accordance with the switching signal Ss so as to produce a composite recording signal Sr.

The composite recording signal Sr is supplied to a recording amplifier 22, where the digital recording signal Sf and the digital servo pilot signal Se included in the composite recording signal Sr are current-amplified in accordance with the switching signal Ss supplied thereto from the input terminal 14. As a result, an amplified recording signal Sm, in which the digital servo pilot signal Se has a level higher than that of the digital recording signal Sf, is obtained and supplied to output terminals 16 and 17.

Thereafter, the amplified recording signal Sm is supplied through a rotary transformer 24, which is connected to the output terminals 16 and 17, to a magnetic head 26 so as to be magnetically recorded on a magnetic tape Tp.

The operation of the above-described digital signal processing apparatus will now be described in detail below. The digital multiplexer 20 receives the digital recording signal Sf, the digital servo pilot signal Se and the digital switching signal Ss such as those shown in FIGS. 2A, 2B and 2C, respectively. In the digital multiplexer 20, the digital recording signal Sf and the digital servo pilot signal Se are combined with each other on a time basis corresponding to the switching signal Ss, so as to produce the composite recording signal Sr of FIG. 2D which is supplied from the multiplexer 20.

The composite recording signal Sr is supplied to the recording amplifier 22 together with the switching signal Ss. In the recording amplifier 22, the digital recording signal Sf and the digital servo pilot signal Se of the composite recording signal Sr are discriminated and current-amplified to obtain the amplified recording signal Sm such as that shown in FIG. 2E. Therefore, as previously described, the amplified recording signal Sm is obtained by synchronizing the digital servo pilot signal Se and the digital recording signal Sf with the switching signal Ss and discriminating on a time basis, whereupon the digital servo pilot signal Se is amplified so as to obtain a digital servo pilot signal Sea (FIG. 2E) which has a current greater than that of the digital recording signal Sf. Thereafter, the amplified recording signal Sm is supplied through the rotary transformer 24 to the magnetic head 26 so as to be magnetically recorded on the magnetic tape Tp.

Thus, the digital recording signal Sf and the digital servo pilot signal Se can be discriminatively amplified so as to have the desired individual currents. As a result, it is possible to eliminate the need for the high-frequency amplifier which is normally utilized to amplify a relatively complicated wide-band signal to a desired flat level. Hence, the circuit configuration may be simplified while, at the same time, facilitating the control action.

Two examples of the recording amplifier 22 included in the apparatus of FIG. 1 will be described below.

Figure 3:
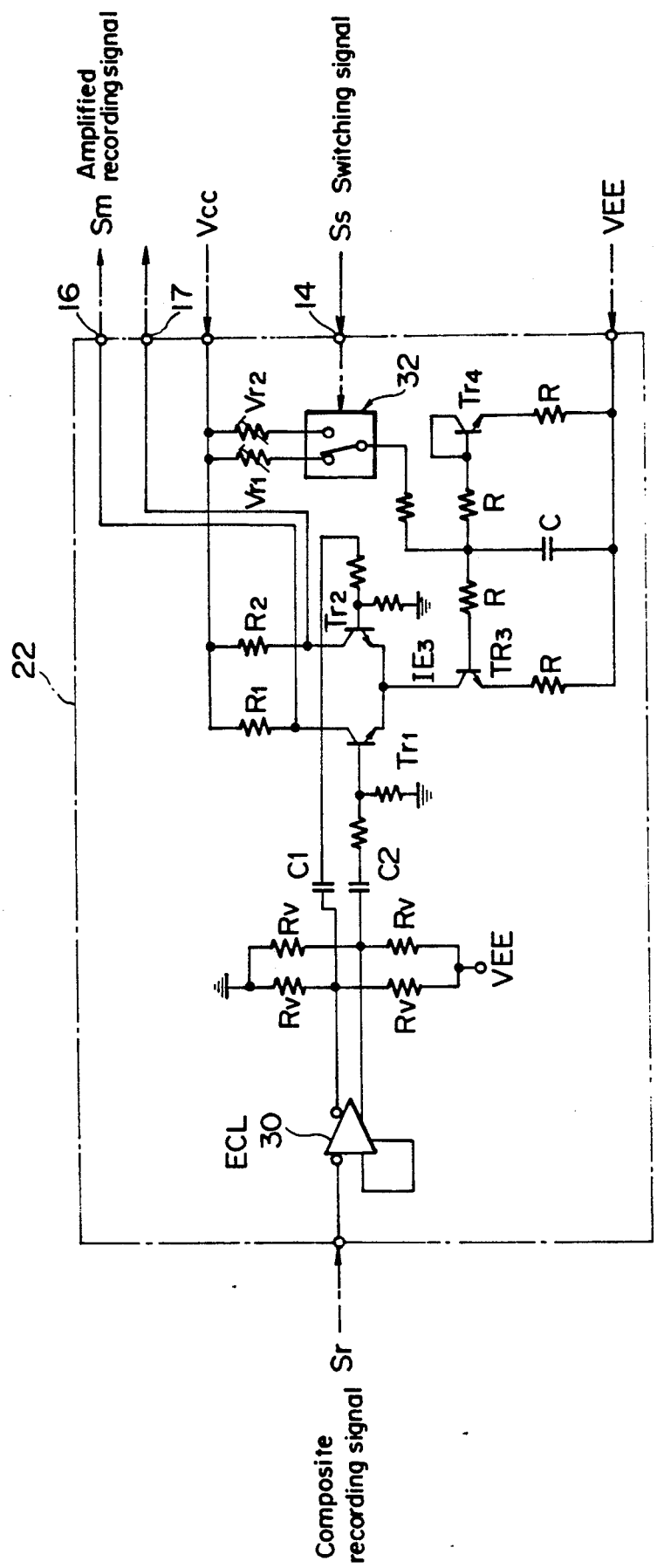
FIG. 3 is a circuit diagram of a recording amplifier which may be used in the digital signal processing apparatus of FIG. 1.

The first example of the recording amplifier 22 is illustrated in FIG. 3. As shown therein, the recording amplifier 22 includes an emitter-coupled logic (ECL) circuit 30, which is supplied with the composite recording signal Sr of FIG. 2D, a bridge circuit for matching a group of resistors Rv, and a differential amplifier composed of transistors TR1 and TR2 which are connected to an output terminal of the ECL circuit 30 via coupling capacitors C1 and C2 and so forth.

The recording amplifier 22 further includes load resistors R1 and R2 which are connected between a terminal Vcc and the collectors of the differential amplifier. The amplified recording signal Sm is obtained from the collectors of the differential amplifier by differential amplification and is supplied through output terminals 16 and 17 to the rotary transformer 24 (FIG. 1). Transistors TR3 and TR4 are connected to form a known current mirror circuit for equalizing the emitter current $IE_3$ during the operation of the differential amplifier. Furthermore, a group of resistors R for enabling a desired value of the emitter current $IE_3$ to be set and a capacitor C for blocking positive feedback are provided and coupled to the current control transistor TR3 and the transistor TR4 for stabilizing the base driving current. Also, a semiconductor switch 32 is included which is adapted to selectively change in accordance with the switching signal Ss supplied thereto from input terminal 14 so as to change the levels of the digital recording signal Sf and the digital servo pilot signal Se. Variable resistors Vr1 and Vr2 are connected between the terminal Vcc and two of the contacts of the semiconductor switch 32, as shown in FIG. 3.

In the recording amplifier 22 of FIG. 3, the composite recording signal Sr supplied to the ECL circuit 30 is phase-inverted therein so as to produce a signal having a predetermined form, which is then supplied via coupling capacitors C1, C2 and so forth to the transistors TR1 and TR2 of the differential amplifier. The emitter currents $IE_3$ present during the amplification processing by the transistors TR1 and TR2 are mutually equalized by the operations of the transistors TR3 and TR4 which, as previously described, are connected so as to form a current mirror circuit. When the switching signal Ss (FIG. 2C) which is supplied to the semiconductor switch 32 is at a relatively high level, the transistor TR2 is turned on, while the transistor TR1 is turned off. In this situation, a current flows in the load resistor R2, the rotary transformer 24 (FIG. 1) and the transistor TR3. The current value in this situation is set by the driving current of the transistor TR3 in accordance with the value of the variable resistor Vr2 connected to the semiconductor switch 32 which is selectively switched in synchronism with the switching Ss. On the other hand, when the switching signal Ss (FIG. 2C) which is supplied to the semiconductor 32 is at a relatively low level, the transistor TR1 is turned on, while the transistor TR2 is turned off. In this situation, a current flows in the load resistor R1, the rotary transformer 24 (FIG. 1) and the transistor TR3. The current value in this situation is set by the base driving current of the transistor TR3 in accordance with the value of the variable resistor Vr1 connected to the switch 32 which is selectively switched in synchronism with the switching signal Ss. The value of the variable resistor Vr2 is preset such that when the switching signal Ss is at its high level, the current flowing in the transistor TR3 is greater than the current obtained when the switching signal Ss is at its low level. As a result, the amplified recording signal Sm from the recording amplifier 22 is shaped into the desired waveform as, for example, that shown in FIG. 2E where the current of the digital servo pilot signal Se is rendered greater (Sea) than that of the digital recording signal Sf.

The individual circuit components without reference designations depicted in FIG. 3 are connected as shown and will not be discussed further, since the connections are apparent to those skilled in the art and are not necessary for an understanding of the present invention.

Figure 4:
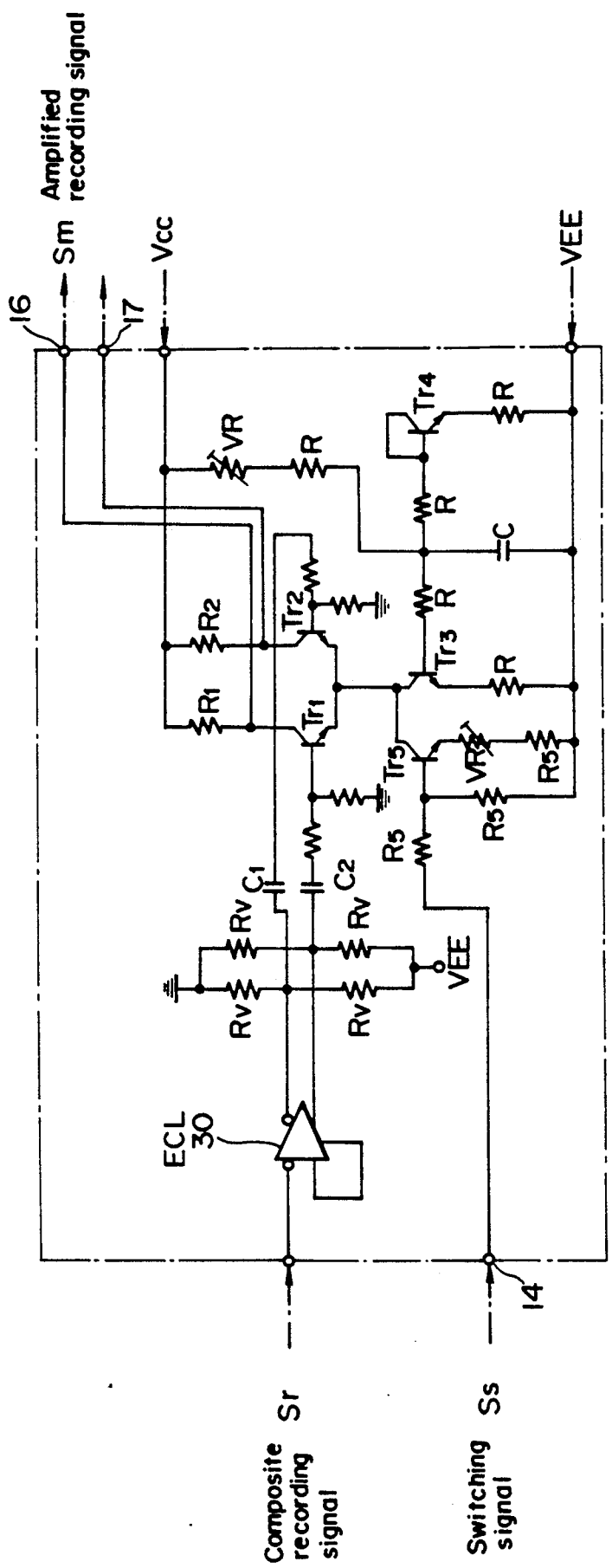
FIG. 4 is another circuit diagram of a recording amplifier which may be used in the digital signal processing apparatus of FIG. 1

The second example of the recording amplifier 22 will not be described with reference to FIG. 4. In comparison with the foregoing first example of the recording amplifier 22 mentioned above, in the second example the transistor TR3, a group of resistors R5, a variable resistor VR which is connected in series to the emitter of a transistor TR5, and the transistor TR5 which is connected to the transistor TR3 constitute an amplifier, and the switching signal Ss is supplied thereto to be amplified. When the amplified switching signal Ss is in a high-level duration or when the amplified digital recording signal Sm is at a high level, the transistor TR2 is turned on, while the transistor TR1 is turned off. In this situation, the value of the current flowing in the load resistor R2, the rotary transformer 24 (FIG. 1) and the transistor TR3 is greater than the value in the aforementioned first example. The maximum value of such current is set by the value of the variable resistor VR which is connected in series to the emitter of the transistor TR5. Meanwhile, when the switching signal Ss is in a low-level duration, the operation performed is substantially inverse to that performed in the aforementioned high-level duration. Since the remaining operation of the recording amplifier of FIG. 4 is substantially the same as that of the first example of FIG. 3, a repeated explanation thereof is omitted. Further, as is to be appreciated, with the exception of the circuit components previously described, the recording amplifier 22 of FIG. 4 contains substantially the same components which are similarly connected as those of the recording amplifier of FIG. 3 and, as such, further explanation relating thereto is omitted.

The input digital recording signal Sf, and the input digital servo pilot signal Se are thus processed to form a composite recording signal Sr. Thereafter, the digital recording signal Sf and the digital servo pilot signal Se of such composite recording signal Sr are discriminatively amplified to desired current levels so as to produce an amplified recording signal Sm in which the current of the digital servo pilot signal Se is greater than that of the digital recording signal Sf. The amplified recording signal Sm is supplied to the rotary transformer 24. Thereafter, the digital servo pilot signal Se having the desired greater current is magnetically recorded on the magnetic tape Tp by means of the magnetic head 26.

In the above-described digital signal processing apparatus of the present invention, since the signal processing by the digital multiplexer 20 is executed in digital form, satisfactory stability in the composite recording signal Sr is obtained. Further, the amplified recording signal Sm is which the digital servo pilot signal Se has the desired greater current is obtained relatively easily. Furthermore, since the circuit configuration is relatively simple and the control action is performed relatively easily, the reliability is enhanced.

Although a preferred embodiment of the present invention has been described in detail herein, it is not limited merely to that precise embodiment, and a variety of changes and modifications may be effected by one skilled in the art without departing from the spirit and scope of the invention as defined by the appended claims.

What is claimed is:

1. A digital recording apparatus for recording a digital information signal and a digital pilot signal on a recording medium, said apparatus comprising:
   digital multiplexing means receiving said digital information and pilot signals and a switching signal for time-multiplexing said digital information signal and said digital pilot signal into a composite digital recording signal having information and pilot signal portions in a time-multiplexed relation determined by said switching signal;
   variable gain amplifier means for variably amplifying the current of said composite digital recording signal so as to provide an amplified digital recording signal;
   transducer means current-driven by said amplified digital recording signal for recording the latter on a record medium; and
   means for controlling the gain of said variable gain amplifier means in response to said switching signal so that, in said amplified digital recording signal which current-drives the transducer means, said pilot signal portion has a current level substantially larger than the current level of said information signal portion.

2. A digital recording apparatus as in claim 1; in which said transducer means includes a rotary magnetic head, and rotary transformer means for transmitting said amplified digital recording signal to said rotary magnetic head.

3. A digital recording apparatus as in claim 2; in which said variable gain amplifier means includes a differential amplifier having transistors with connected together emitters; and in which said means for controlling the gain includes means for changing a current through said emitters of said differential amplifier.

* * * * *